(12) United States Patent
Suanno

(10) Patent No.: US 11,679,825 B2
(45) Date of Patent: Jun. 20, 2023

(54) ANNULAR SUPPORT STRUCTURE FOR TRACK VEHICLE

(71) Applicant: Caterpillar Inc., Peoria, IL (US)

(72) Inventor: Gennaro Suanno, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 851 days.

(21) Appl. No.: 16/659,136

(22) Filed: Oct. 21, 2019

(65) Prior Publication Data

US 2021/0114674 A1    Apr. 22, 2021

(51) Int. Cl.
| | | |
|---|---|---|
| *B62D 55/15* | (2006.01) | |
| *B62D 55/20* | (2006.01) | |
| *B60B 3/08* | (2006.01) | |
| *B60B 25/00* | (2006.01) | |

(52) U.S. Cl.
CPC .............. *B62D 55/15* (2013.01); *B60B 3/087* (2013.01); *B60B 25/002* (2013.01); *B62D 55/202* (2013.01)

(58) Field of Classification Search
CPC ........ B62D 55/15; B62D 55/14; B60B 3/087; B60B 25/002
See application file for complete search history.

(56) References Cited

U.S. PATENT DOCUMENTS

| | | |
|---|---|---|
| 3,842,475 A | 10/1974 | Clasper et al. |
| 3,915,511 A * | 10/1975 | Clasper ............... B60B 3/08 474/197 |
| 3,993,356 A * | 11/1976 | Groff ................. B62D 55/0966 305/136 |
| 5,188,278 A | 2/1993 | Amao |
| 5,718,485 A | 2/1998 | Ing |
| 5,762,405 A | 6/1998 | Dempsey |
| 6,012,784 A * | 1/2000 | Oertley ............. B62D 55/0966 305/195 |
| 6,428,114 B1 | 8/2002 | Lightcon |
| 2011/0083486 A1 | 4/2011 | Bierhalter et al. |
| 2011/0241414 A1 | 10/2011 | Beam |

(Continued)

FOREIGN PATENT DOCUMENTS

| | | | |
|---|---|---|---|
| CN | 106218744 A * | 12/2016 | ............. B62D 55/14 |
| CN | 108974163 | 12/2018 | |

(Continued)

OTHER PUBLICATIONS

Machine Translation of CN 106218744 A, 5 pages (Year: 2016).*

*Primary Examiner* — S. Joseph Morano
*Assistant Examiner* — Emily G. Castonguay

(57) ABSTRACT

An annular support structure for a track vehicle is disclosed herein. The annular support structure includes a first piece and a second piece. The first piece includes a first hub portion, a first web extending radially outward from the first hub portion, and a first outer body extending radially outward from the first web. The second piece includes a second hub portion, a second web extending radially outward from the second hub portion, and a second outer body extending radially outward from the second web. The first piece and the second piece joined together at an inner joint located proximate to the first hub portion and the second hub portion and the first piece and the second piece adjacent to each other at an outer joint located proximate to the first outer body and the second outer body.

19 Claims, 4 Drawing Sheets

(56) References Cited

U.S. PATENT DOCUMENTS

| | | | |
|---|---|---|---|
| 2012/0153712 A1* | 6/2012 | Simula | B62D 55/145 |
| | | | 305/136 |
| 2014/0001824 A1* | 1/2014 | Meyer | B62D 55/21 |
| | | | 305/136 |
| 2014/0001825 A1 | 1/2014 | Caterpillar | |
| 2018/0072358 A1* | 3/2018 | Vik | B62D 55/088 |
| 2019/0233031 A1 | 8/2019 | Wang et al. | |

FOREIGN PATENT DOCUMENTS

| | | |
|---|---|---|
| EP | 0344762 | 12/1989 |
| JP | S56124071 | 9/1981 |
| JP | S5983177 | 6/1984 |

\* cited by examiner

ANNULAR SUPPORT STRUCTURE FOR TRACK VEHICLE

TECHNICAL FIELD

The present disclosure generally pertains to track vehicles. More particularly this disclosure is directed toward an annular support structure for a track vehicle.

BACKGROUND

Some mobile machines have undercarriages with track assemblies that move along the ground as the machine travels. For example, many earthmoving machines like tractors and excavators may have such track assemblies. These track assemblies typically include an endless track that extends around various components that guide the endless track. In many track assemblies, the components that guide the endless track include a track idler that guides one end of the endless track.

U.S. Patent Publication No. 2014/0001825 to Hakes describes a track idler including a hub having a first portion and a second portion. The track idler also includes a first web extending radially outward from the first portion of the hub. The first web and the first portion of the hub being formed from a single, unitary piece of parent material. Additionally, the track idler may include a second web spaced laterally from the first web. The second web extends radially outward from the second portion of the hub. The second web and the second portion of the hub being formed from a single, unitary piece of parent material.

The present disclosure is directed toward improvements in the art.

SUMMARY

An annular support structure for a track vehicle is disclosed herein. The annular support structure includes a first hub portion, a first web, and a first outer body portion. The first hub portion circumferentially extends around a lateral axis. The first web extends radially outward from the first hub portion. The first outer body portion is located radially outward from the first web. The annular support structure further includes a second hub portion, a second web, and a second outer body portion. The second hub portion circumferentially extends around the lateral axis. The second hub portion adjoined to the first hub portion at an inner joint. The second web is spaced apart from the first web. The second web extends radially outward from the second hub portion. The second outer body portion is located radially outward from the second web. The second outer body portion adjacent to the first outer body portion at an outer joint.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Furthermore, some of the features and surfaces have been left out or exaggerated for clarity and ease of explanation.

Figure 1:
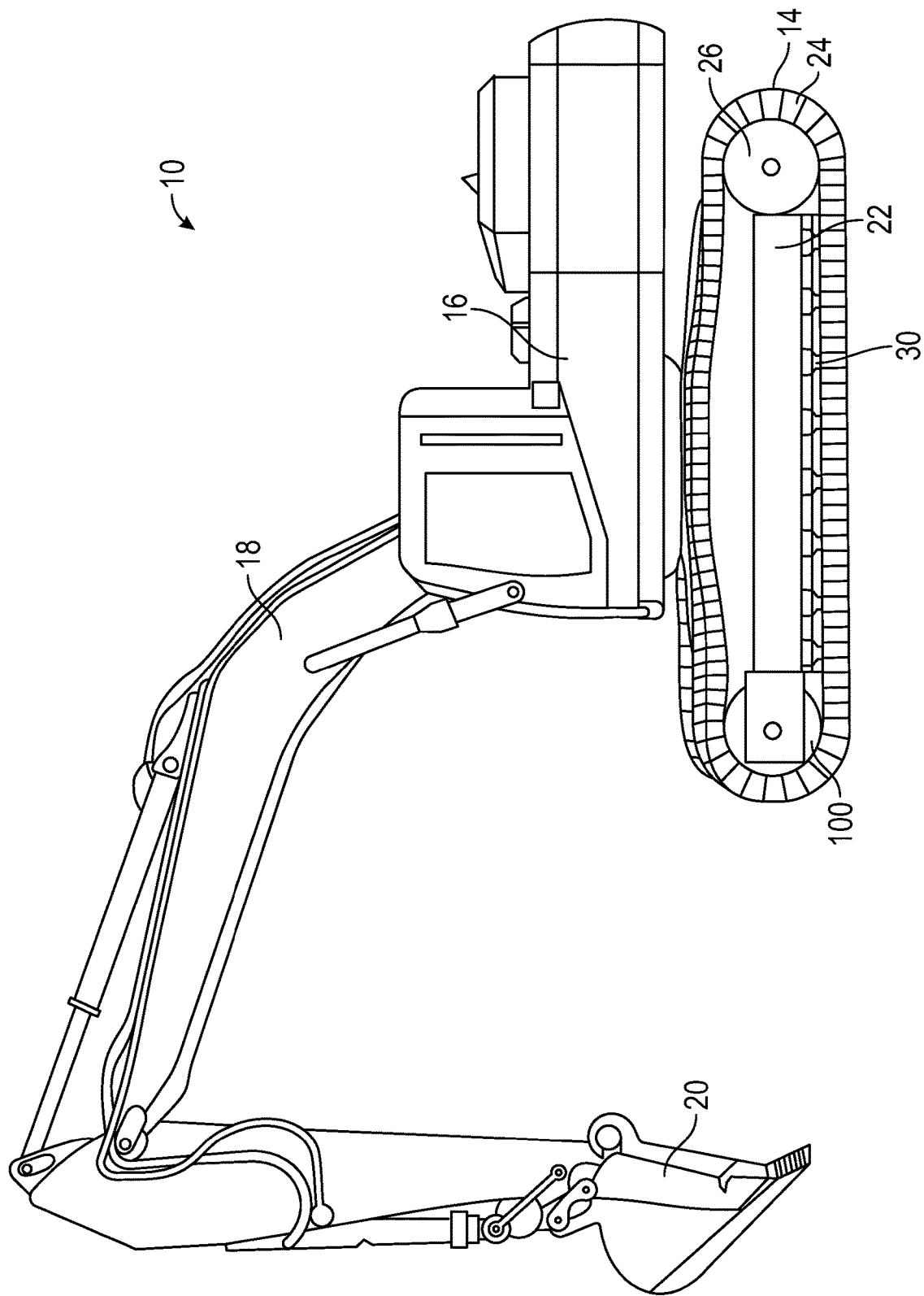
FIG. 1 is an illustration of a an exemplary track vehicle with an annular support structure.

FIG. 1 is an illustration of a track vehicle with an annular support structure. Where the drawing includes multiple instances of the same feature, for example rollers 30, the reference number is only shown in connection with one instance of the feature to improve the clarity and readability of the drawing. This also true in other drawings which include multiple instances of the same feature.

FIG. 1 illustrates a machine 10 (sometimes referred to as a track vehicle) with a track assembly 14 that may use an annular support structure 100 (sometimes referred to as an annular support structure) according to the present disclosure. Machine 10 may include a pair of track assemblies 14, only one of which is shown in FIG. 1. Machine 10 may be any type of machine that includes an undercarriage with one or more track assemblies 14. In the embodiment shown, machine 10 is an excavator having a superstructure 16 pivotally supported from the undercarriage. In this embodiment, machine 10 may include an implement 18, which may have an excavating bucket 20 attached to it for digging. Machine 10 may alternatively be another type of machine, including, but not limited to, a track-type tractor. In examples the track can be oval and have one annular support structure per track or include a high drive with two annular support structures per track.

Each track assembly 14 may be configured to support machine 10 from and move along the ground, roads, and/or other types of terrain. Each track assembly 14 may include a track roller frame 22, various guide components engaged to track roller frame 22, a drive sprocket 26, an annular support structure 100, rollers 30, and an endless track 24 extending around drive sprocket 26, the annular support structure 100, and rollers 30.

Figure 2:
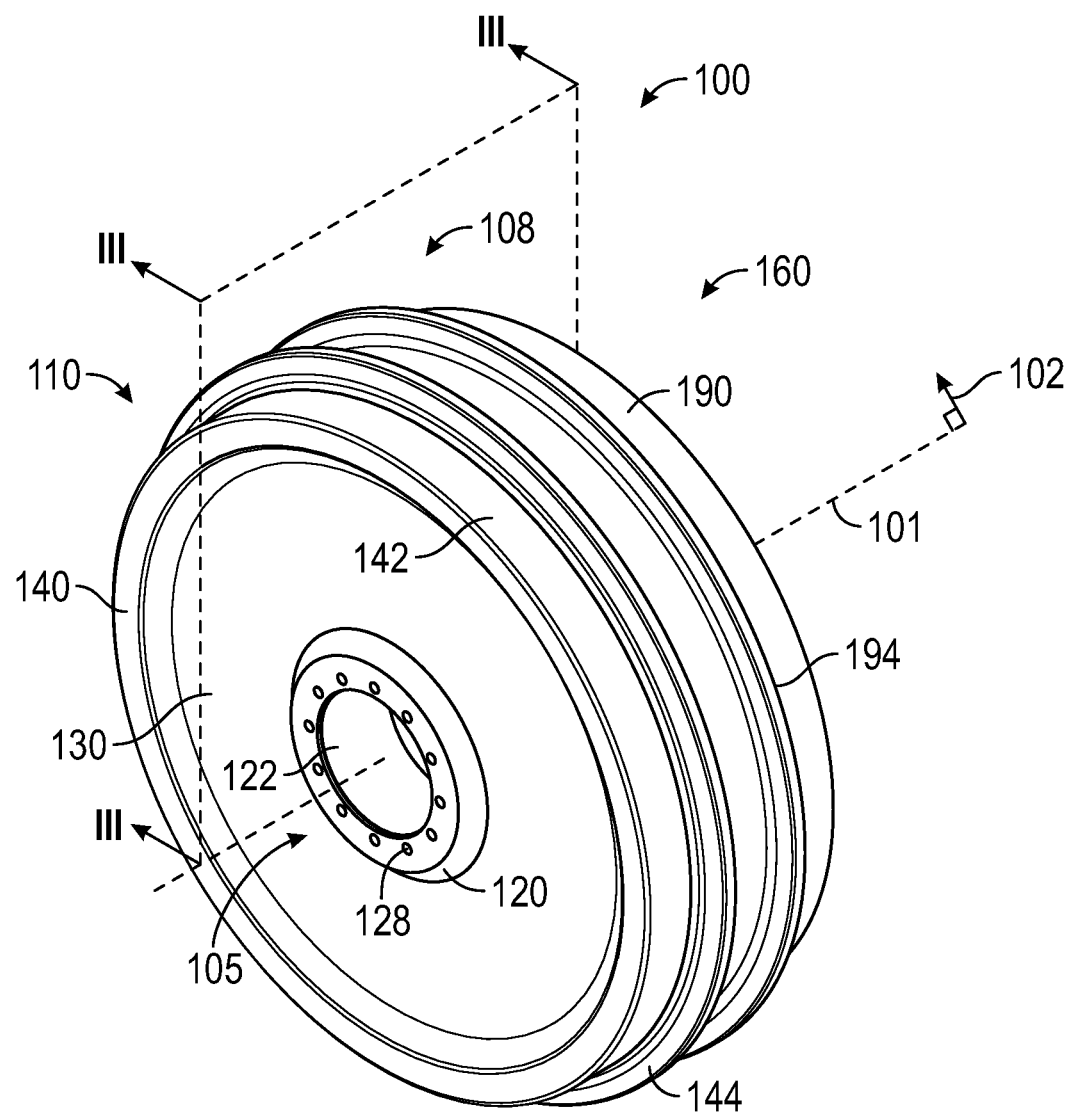
FIG. 2 is a perspective view of an embodiment of the annular support structure from FIG. 1.

FIG. 2 is a perspective view of an embodiment of the annular support structure from FIG. 1. The annular support structure 100 may be constructed of various materials, such as metal. For example, the annular support structure 100 may be constructed of a ferrous metal, such as steel or iron. The annular support structure 100 may be an annular support structure rim, a roller, or other similar rim structures.

The annular support structure 100 can include a hub 105 and an outer body 108. The annular support structure 100 can include a first piece (or side) 110 and a second piece (or side) 160 laterally adjacent to the first piece 110. The first piece 110 and second piece 160 can each substantially form half of the hub 105 and the outer body 108. The hub 105 can be configured to be connected to track roller frame 22 in a manner such that the annular support structure 100 may rotate about a lateral axis 101. The hub 105 can form a central passage 122 having a substantially cylindrical shape.

The longitudinal direction of the central passage 122 can define the lateral axis 101 and a radial direction 102 perpendicular to the lateral axis 101.

The lateral axis 101 may be common to or shared with the first piece 110 and second piece 160 of the annular support structure 100. All references to radial, lateral, and circumferential directions and measures refer to lateral axis 101, unless specified otherwise. Terms such as "inner" and "outer" generally indicate a lesser or greater radial distance from the lateral axis 101, wherein the radial direction 102 may be in any direction perpendicular to and radiating outward from the lateral axis 101.

The outer body 108 can be concentric to the hub 105. The outer body 108 can be configured to engage with the track 24.

The first piece 110 can have a first hub portion 120, a first web 130, and a first outer body portion 140. The first hub portion 120 can be substantially half of the hub 105. In other words, the hub 105 includes the first hub portion 120. The first hub portion 120 can extend circumferentially around the lateral axis 101. The first hub portion 120 can form a frusto conical shape centered on the lateral axis 101. In an embodiment the frustoconical shape of the first hub portion 120 includes a cylindrical shaped void and forms part of a central passage 122 along the lateral axis 101. The first hub portion 120 may also include first depressions 128 which can be for rotationally engaging the hub 105 to one or more components connected to track roller frame 22. First depressions 128 may be configured to engage components that include, but are not limited to, bearings, axles, and/or spindles.

The first web 130 may extend radially outward from and circumferentially around the first hub portion 120 extending to the first outer body portion 140. The first web 130 may have a solid construction as shown in the drawings or it have one or more openings.

The first outer body portion 140 may be located radially outward from and circumferentially around the first web 130. In other words, the first outer body portion 140 encircles the first web 130. The first outer body portion 140 can extend outward from the first web 130. The first outer body portion 140 can have a first annular tread surface 142. The first annular tread surface 142 can be an outwardly faced surface of the first outer body portion 140. The first annular tread surface 142 may also extend substantially concentric with lateral axis 101. In some embodiments, first annular tread surface 142 may also extend generally parallel to lateral axis 101.

The first piece 110 can include a first guide flange 144 extending radially outward from and circumferentially around the first outer body portion 140. The first guide flange 144 may extend radially outward of the first annular tread surface 142. In an embodiment, the base of the first guide flange 144 may be disposed adjacent to first annular tread surface 142. The first guide flange 144 can extend radially outward from proximate to the first outer protrusion 145. In other examples, the first guide flange 144 may have its base at various other places on the outer surface of the first piece 110.

The second piece 160 has similar or identical features to the first piece 110. In one embodiment they are mirror images of each other. For example the second piece 160 includes a second outer body portion 190, a second annular tread surface 192, and a second guide flange 194 which are similar or identical to the first outer body portion 140, first annular tread surface 142, and first guide flange 144 of the first piece. Therefore the description of similar or identical features of the first piece 110 may be applied again to the similar or identical referenced features of the second piece 160, here and in other figures.

FTC. 3 is a cross-section view of the annular support structure 100 taken along the plane III-III from FIG. 2. The first piece 110 and the second piece 160 can be secured to one another at an inner joint 150 and an outer joint 155. The inner joint 150 may be located at a middle portion of the annular support structure 100, such as along a center plane 103 that extends perpendicular to lateral axis 101 through the lateral center of the annular support structure 100.

In some embodiments, each piece 110, 160 may be constructed from a single, unitary piece of parent material. For example, in some embodiments, each piece 110, 160 may be a forging, a casting, or a piece formed from machining a billet or other piece of metal stock. Structures formed from a single, unitary piece of parent material may include structures that are formed without welded joints, glued joints, fastened joints, press-fit joints or the like to hold different portions of the structure together.

The first piece 110 may include the first hub portion 120, the first web 130, the first outer body portion 140, and the first guide flange 144. Thus, all of these structures may be formed from a single, unitary piece of parent material.

At the inner joint 150, the first hub portion 120 may have a first inner protrusion 125 adjoined to a second inner protrusion 175. The first inner protrusion 125 can extend generally laterally from the inner joint 150 towards the first web 130.

The hub 105 can include a first hub inner wall 121 and a second hub inner wall 171. The first hub inner wall 121 and the second hub inner wall 171 can be the inward most surface of the annular support structure 100. The first hub inner wall 121 and the second hub inner wall 171 can form the central passage 122.

The hub 105 may have other features that help reduce weight and withstand the loads experienced in use. For example, the hub may have a first inner concave surface 126 extending from the first inner protrusion 125 and towards the lateral axis 101. In an embodiment the first inner concave surface 126 has a constant radius. The first inner concave surface 126 may help suppress stress concentrations at the radially inner area.

The hub 105 may have a first inner convex surface 127 extending from the first inner concave surface 126 to the first hub inner wall 121. In an embodiment the first inner convex surface 127 has a constant radius.

The hub may have a second inner concave surface 176 extending from the second inner protrusion 175 and towards the lateral axis 101. In an embodiment the second inner concave surface 176 has a constant radius. The second inner concave surface 176 may help suppress stress concentrations at the radially inner area.

The hub 105 may have a second inner convex surface 177 extending from the second inner concave surface 176 to the second hub inner wall 171. In an embodiment the second inner convex surface 177 has a constant radius.

The annular support structure 100 may have an inner gap 156 formed by the first inner convex surface 127, the first inner concave surface 126, the first inner protrusion 125, the second inner protrusion 175, the second inner concave surface 176, and the second inner convex surface 177. In an embodiment, the inner gap 156 extends from the first hub inner wall 121 and the second hub inner wall 171 to adjacent to the first inner protrusion 125 and the second inner protrusion 175. The inner gap 156 may be positioned between the first hub portion 120 and the second hub portion 170.

The first inner protrusion 125 may taper from proximate the first web 130 to narrower adjacent the inner joint 150. In other examples the first inner protrusion 125 can be straight without a taper.

The first web 130 may be shaped to be wider adjacent the first hub portion 120 in comparison to the middle portion of the first web 130. The first web 130 may be shaped to be wider adjacent the first outer body portion 140 in comparison to the middle portion of the first web 130. The first web 130 can have an arcuate shaped cross section, extending from the first hub portion 120 to the first outer body portion 140. In an embodiment the first web 130 has a concave side positioned closest to the center plane 103 and a convex side positioned opposite from the concave side. The first web 130 may be spaced laterally from the first inner protrusion 125 and, thus, from center plane 103 of the annular support structure 100.

In some embodiments, the thickness of the first web 130 may vary as it extends radially outward. For example, the thickness of first web 130 may decrease as it extends radially outward from the first hub portion 120 to a middle portion and increase in thickness as the first web 130 extends from the middle portion to the first outer body portion 140. This may provide efficient material usage, as it places more material in the web at the radially inner and outer areas, where greater strength can be used to withstand higher bending moments.

The first web 130 may have other features that help it withstand the loads experienced in use. For example, the first web 130 may have concave radiused surfaces on both sides adjacent its radially inner and outer areas. These concave radiused surfaces may help suppress stress concentrations at the radially inner and outer areas.

The first outer body portion 140 may extend substantially concentric with lateral axis 101. The first outer body portion 140 can be shaped as an annulus centered about the lateral axis 101. At the outer joint 155, the first outer body portion 140 may have a first outer protrusion 145 adjoined to a second outer protrusion 195. In an embodiment the first outer body portion 140 include the first outer protrusion 145. The first outer protrusion 145 can be concentric to the first inner protrusion 125. The first outer protrusion 145 can be spaced from and positioned outward of the first inner protrusion 125. The first outer protrusion 145 can generally extend laterally from the outer joint 155 towards the first web 130.

The outer body 108 may have other features that help it withstand the loads experienced in use. For example, the outer body 108 may have a first outer concave surface 146 proximate to the first guide flange 144. In an embodiment, the first outer concave surface 146 extends from the first guide flange 144 to the outer joint 155. The first outer concave surface 146 may help suppress stress concentrations.

The outer body 108 may have a second outer concave surface 196 proximate to the second guide flange 194. In an embodiment, the second outer concave surface 196 extends from the second guide flange 194 to the outer joint 155.

The first outer protrusion 145 may taper from proximate the first guide flange 144 to narrower adjacent the outer joint 155.

In an embodiment the first inner protrusion 125, second inner protrusion 175, first outer protrusion 145, and second outer protrusion 195 taper narrower as they approach the lateral center of the annular support structure 100.

The first guide flange 144 may be directly or indirectly connected to first outer body portion 140. The first guide flange 144 may have its base at various other places.

Similar to the first piece 110 of the annular support structure 100, the second piece 160 may include a second hub portion 170, a second web 180, a second outer body 190, a second annular tread surface 192, a second guide flange 194, a second inner protrusion 175, and a second outer protrusion 195. In some embodiments, the second piece 160 and its second hub portion 170, second web 180, second outer body 190, second annular tread surface 192, second guide flange 194, second inner protrusion 175, and second outer protrusion 195 may have a construction substantially identical to the first piece 110 and the structures thereof, except that second piece 160 may be mirrored relative to center plane 103.

The second guide flange 194 can be laterally spaced apart from the first guide flange 144. The second guide flange 194 can extend radially outward from proximate the second outer protrusion 195.

In an embodiment the second piece 160 includes second depressions 178, which are similar to the first depressions of the first piece 110.

The first hub portion 120 and the second hub portion 170 can form the hub 105. The first hub portion 120 and the second hub portion 170 can form the central passage 122.

At the inner joint 150, inner protrusions 125, 175 of the first hub portion 120 and the second hub portion 170 may be secured to one another to secure pieces 110, 160 to one another. Various means may be used to secure inner protrusions 125, 175 at inner joint 150. In some embodiments, inner protrusions 125, 175 may be welded to one another. In an example inter protrusions 125, 175 can abut against each other and be friction welded to form inner joint 150.

Similar to inner joint 150, at outer joint 155, outer protrusions 145, 195 of the first outer body portion 140 and the second outer body portion 190 may be secured to one another to secure pieces 110, 160 to one another. Various means may be used to secure outer protrusions 145, 195 at outer joint 155. In some embodiments, outer protrusions 145, 195 may be welded to one another. In an example outer protrusions 145, 195 can be adjacent to one another and can abut against each other. In an example outer protrusions 145, 195 can be friction welded to form outer joint 155.

In an embodiment the second outer protrusion 195 interfaces with the first outer protrusion 145 to form the outer joint 155 concentric to the inner joint 150. The outer joint 155 and the inner joint 150 can extend circumferentially around the lateral center of the annular support structure 100.

The annular support structure 100 can have a cavity 157. The cavity 157 can be formed by the hub 105, the first web 130, the outer body 108, and the second web 180.

An annular outer gap 158 may extend from the radially outer most portion of the annular support structure 100 to adjacent the first outer protrusion 145 and the second outer protrusion 195 of first and second piece 110, 160. The outer gap 158 can be formed by the first guide flange 144, the first outer concave surface 146, the second outer concave surface 196, and the second guide flange 194. The outer gap 158 may separate the first guide flange 144 from the second guide flange 194. In some examples, the annular support structure 100 may have a structure extending from the first guide flange 144 to the second guide flange 194 at the radially outer most portion of the annular support structure 100.

Figure 3:
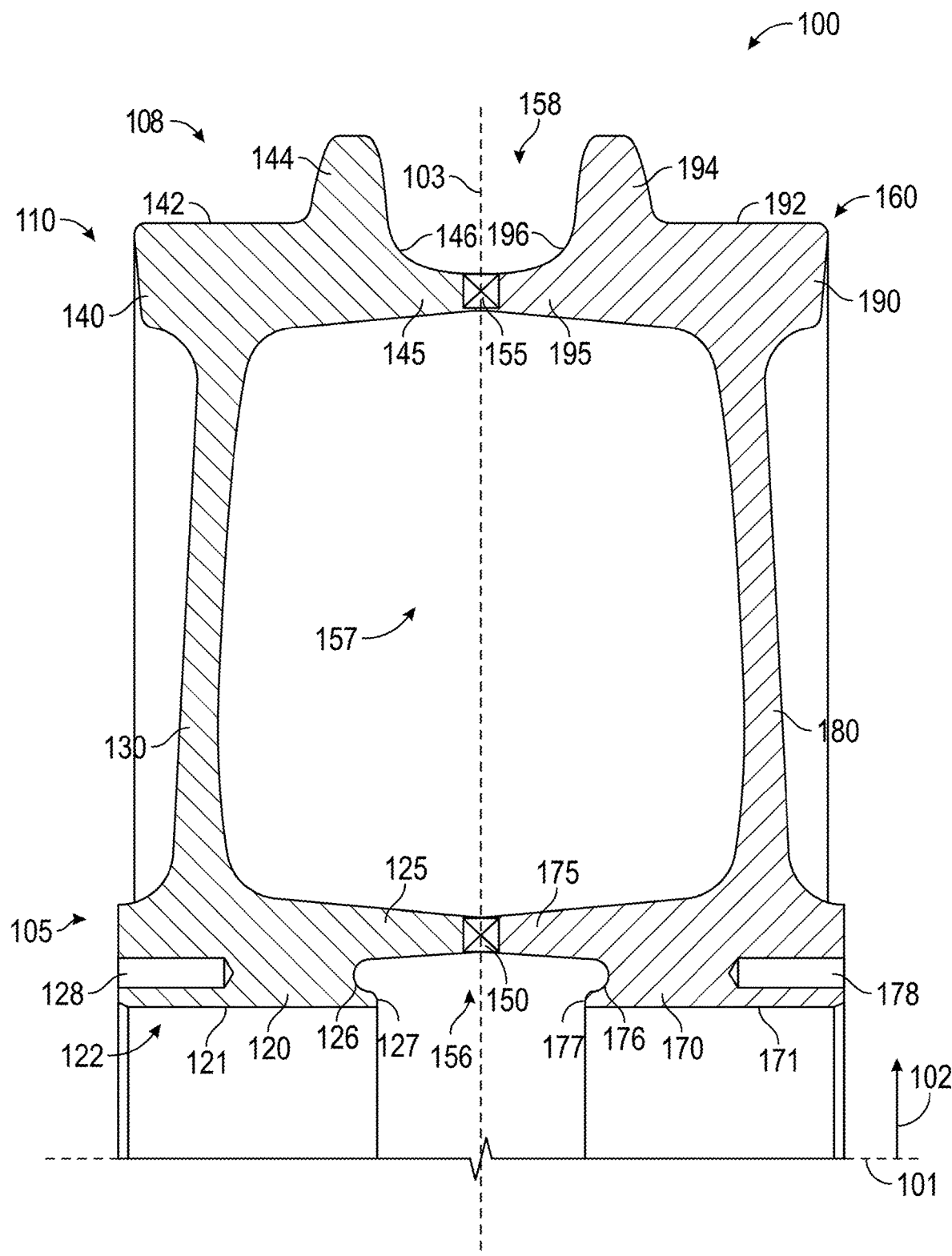
FIG. 3 is a cross-section view of the annular support structure taken along the plane III-III from FIG. 2.
Figure 4:
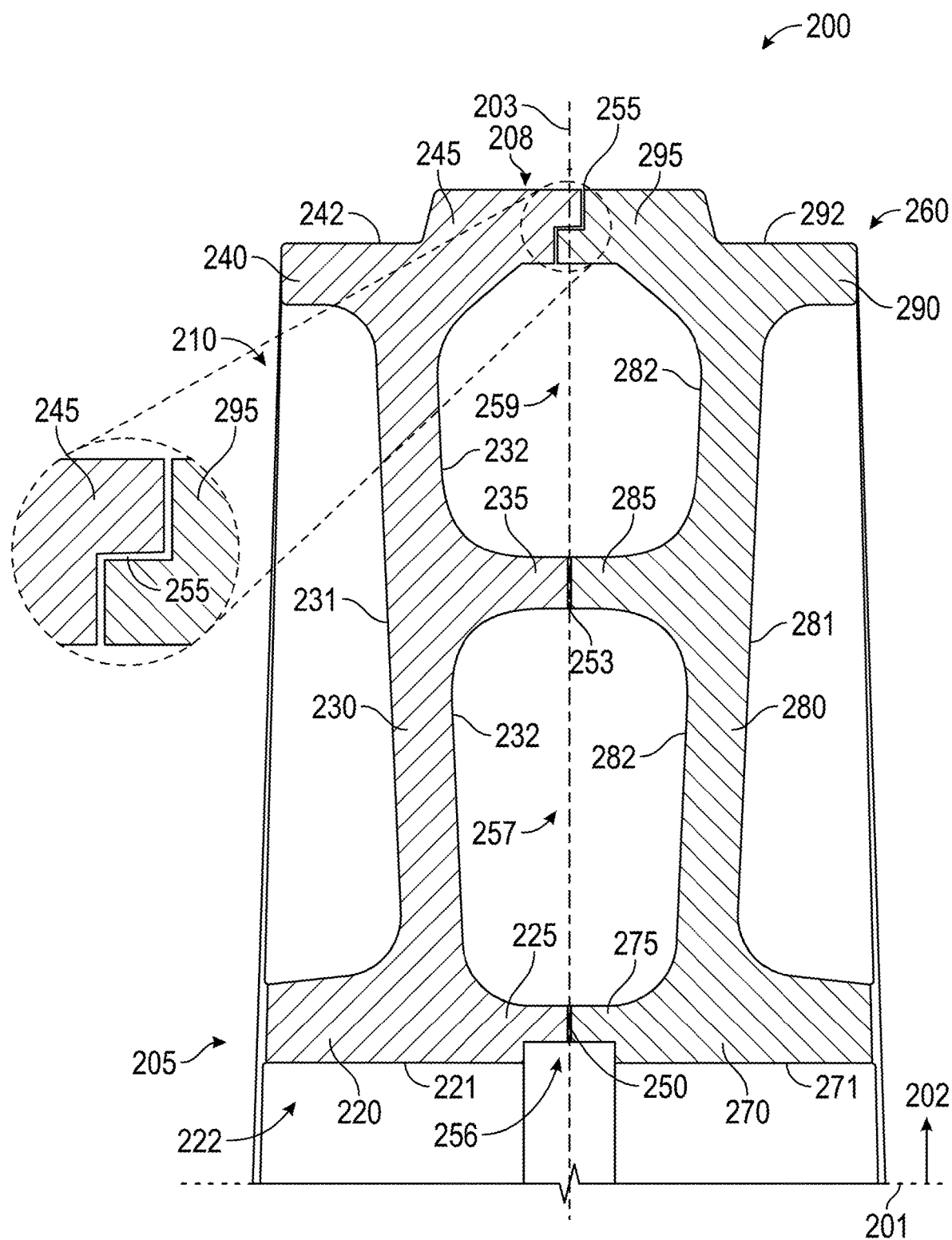
FIG. 4 is a cross sectional view of another annular support structure, similar to FIG. 3.

FIG. 4 is a cross sectional view of another annular support structure, similar to FIG. 3. An annular support structure 200 may be similar to the annular support structure 100 of FIG. 3. The embodiment of the annular support structure 200 in FIG. 4 may have a construction substantially similar to the annular support structure 100 of FIG. 3 and the structures thereof. Structures and features previously described in connection with the earlier described embodiment in FIG. 3 may not be repeated here with the understanding that, when appropriate, that previous description applies to the embodiment depicted in FIG. 4. Additionally, the emphasis in the following description is on variations of previously introduced features or elements.

The annular support structure 200 can include a first piece 210 and a second piece 260. The first piece 210 and the second piece 260 can be secured to one another at an inner joint 250, and a middle joint 253. The annular support structure 200 can include a hub 205, a first web 230, a second web 280, and an outer body 208. The first piece 210 and second piece 260 can each substantially form half of the hub 205 and the outer body 208.

The hub 205 can be configured to be connected to track roller frame 22 in a manner such that the annular support structure 200 may rotate about a lateral axis 201. The hub 205 can form a central passage 222 having a substantially cylindrical shape. The longitudinal direction of the central passage 222 can define the lateral axis 201 and a radial direction 202 perpendicular to the lateral axis 201.

The lateral axis 201 may be common to or shared with the first piece 210 and second piece 160 of the annular support structure 200. All references to radial, lateral, and circumferential directions and measures refer to lateral axis 201, unless specified otherwise. Terms such as "inner" and "outer" generally indicate a lesser or greater radial distance from the lateral axis 201, wherein the radial direction 202 may be in any direction perpendicular to and radiating outward from the lateral axis 201.

The first piece 210 may include a first hub portion 220, the first web 230, and a first outer body portion 240. In an example, all of these structures may be formed from a single, unitary piece of parent material. The second piece 260 may include a second hub portion 270, the second web 280, and a second outer body portion 290. Thus, all of these structures may be formed from a single, unitary piece of parent material.

At the inner joint 250, the first hub portion 220 may have a first inner protrusion 225 adjoined to a second inner protrusion 275 at an inner joint 250. The inner joint 250 can be located along a center plane 203 that extends perpendicular to lateral axis 201 through the lateral center of the annular support structure 200.

The hub 205 can include a first hub inner wall 221 and a second hub inner wall 271. The first hub inner wall 221 and the second hub inner wall 271 can form the central passage 222.

The annular support structure 200 may have an inner gap 256 formed by the first inner protrusion 125 and the second inner protrusion 175. In an embodiment, the inner gap 256 extends from the first hub inner wall 221 and the second hub inner wall 271 to adjacent to the first inner protrusion 225 and the second inner protrusion 275.

A first web 230 can extend linearly outward from the first hub portion 220 to the first outer body portion 240.

The first web 230 can include a first web outer surface 231 and a first web inner surface 232 opposite from the first web outer surface 231. The first web inner surface 232 can generally face towards the center plane 203 and the first web outer surface 232 can generally face away from the center plan 203.

A second web 280 can extend linearly outward from the second hub portion 270 to the second outer body portion 290. The second web 280 can include a second web outer surface 281 and a second web inner surface 282 opposite from the second web outer surface 281. The second web inner surface 282 can generally face towards the center plane 203 and the second web outer surface 282 can generally face away from the center plan 203.

In an embodiment the first middle protrusion 235 extends from proximate the first web inner surface 232 towards the second web 280. The second web 280 can include a second middle protrusion 285. The second middle protrusion 285 can extend from the second web 280 towards the first web 230. In an embodiment the first middle protrusion 235 and the second middle protrusion 285 connect and form middle joint 253. The middle joint 253 can be a weld, such as a friction weld. The middle joint 253 can be located along a center plane 203 that extends perpendicular to lateral axis 201 through the lateral center of the annular support structure 200. The first middle protrusion 235 may taper from proximate the first web inner surface 232 to narrower adjacent the middle joint 253. The second middle protrusion 285 may taper from proximate the second web inner surface 282 to narrower adjacent the middle joint 253.

The first outer body portion 240 may extend substantially concentric with lateral axis 201. At the outer joint 255, the first outer body portion 240 may have a first outer protrusion 245 adjacent to a second outer protrusion 295. The first outer protrusion 245 can be concentric to the first inner protrusion 225. In an embodiment the first outer protrusion 245 can be a first guide flange and the second outer protrusion 295 can be a second guide flange. The first outer protrusion 245 can be adjacent to and can abut the second outer protrusion 295 and form an outer joint 255. In an embodiment the outer joint 255 may include a lap joint, sometimes referred to as a labyrinth, which is formed by the geometry of the first outer protrusion 245 and the second outer protrusion 295 and is not welded together. In other examples the outer joint 255 can be a weld, such as a friction weld. The first outer protrusion 245 and the second outer protrusion 295 can interface to form the outer joint 225. In other words the first outer protrusion 245 can abut, overlap, and mate with the second outer protrusion 295 creating a labyrinth. In other examples the middle joint 253 and the inner joint 250 can be lap joints. The outer joint 255 can be located along a center plane 203 that extends perpendicular to lateral axis 201 through the lateral center of the annular support structure 200.

The first hub portion 220 and the second hub portion 270 can form the hub 205.

The annular support structure 200 can have a first cavity 257. The first cavity 257 can be formed by the hub 205, the first web 230, and the second web 280. In an embodiment, the first cavity 257 is formed by the first inner protrusion 225, the first web inner surface 232, the first middle protrusion 235, the second middle protrusion 285, the second web inner surface 282, and the second inner protrusion 275.

The annular support structure 200 can have a second cavity 259. The second cavity 259 can be formed by the outer body 208, the first web 230, and the second web 280. In an embodiment, the second cavity 259 is formed by the first outer protrusion 245, the first web inner surface 232, the first middle protrusion 235, the second middle protrusion 285, the second web inner surface 282, and the second outer protrusion 295.

INDUSTRIAL APPLICABILITY

The present disclosure generally applies to an annular support structure 100, 200 for a track vehicle 10. It is understood that the annular support structure 100, 200 may be used with any stationary or mobile machine known in the art. Such machines may be used in construction, farming, mining, power generation, and/or other like applications. Accordingly, such machines may include, for example, excavators, track-type tractors, wheel loaders, on-road vehicles, off-road vehicles, generator sets, motor graders, or other like machines.

The disclosed configurations of the annular support structure 100, 200 may provide a number of advantages. For example, the disclosed configurations may provide a cost-effective, durable annular support structure 100, 200. The disclosed configurations may allow assembling annular support structure 100, 200 with a limited number of manufacturing steps. The manufacturer need only make the two pieces 110, 160, 210, 260, join them, and perform any necessary finishing operations.

Each piece 110, 160, 210, 260 may be constructed from a single, unitary piece of parent material using processes such as forging, casting, or machining from billet. Because of the geometry of each piece 110, 160, 210, 260, the pieces 110, 160, 210, 260 may be readily forged or cast without complications related to die lock or molding issues.

Once pieces 110, 160, 210, 260 are formed, they may be brought together and secured to one another. For example, pieces 110, 160, 210, 260 may be welded together at inner joint 150, 250, middle joint 253, and outer joint 155. Any type of welding process may be used to secure pieces 110, 160, 210, 260 to one another at inner joint 150, 250, middle joint 253, and outer joint 155. For example, friction welding may be used by abutting the first inner protrusion 125, 225 to the second inner protrusion 175, 275, first middle protrusion 235 to the second middle protrusion 285, and first outer protrusion 145, to the second outer protrusion 195, and generating relative rotation between pieces 110, 160, 210, 260 to generate enough heat through friction at the protrusions 125, 225, 145, 235, 285, 175, 275, 195, to reach a melting temperature of the pieces 110, 160, 210, 260 to create a friction weld. In another example, friction welding can be performed by vibrating the protrusions 125, 225, 145, 245, 235, 285, 175, 275, 195, 295 relative to each other while they are in contact with each other to generate heat for the friction weld.

Through friction welding, components such as the first middle protrusion 235 and the second middle protrusion 285 can be adjoin together at the middle joint 253, even though access to the middle joint 253 may be blocked off by the inner joint 250 and the outer joint 255. In other examples, one or more joints can exist radially between the inner joint 150, 250 and outer joint 155, 255.

The outer joint 155, 255 can prevent excess debris from collecting between the first web 130, 230 and the second web 180, 280. In an embodiment the labyrinth formed by outer joint 255 and shaped to prevent dirt and debris from entering between the first web 130, 230 and second web 280, 280. For example, without outer joint 155, 255, debris may be able to collect adjacent to the inner joint 150, 250. Furthermore, the annular support structure 100, 200 with the outer joint 155, 255 can provide additional structural support in comparison with an annular support structure without the outer joint 155, 255.

The disclosed configurations also include certain features that may provide annular support structure 100, 200 with considerable strength and durability. For example, constructing the first hub portion 120, 220, first web 130, 230, first outer body portion 140, 240, and first guide flange 144 from a single, unitary piece of parent material may provide desirable strength at the junctures between these structures. Additionally, constructing these components from a single, unitary piece of parent material may make it easier to provide stress relieving features like radiuses at the junctures between these components. Similar advantages apply to the second piece 160, 260.

Some of features may be separate parts that are fastened together. For example the first hub portion 120, 220, first web 130, 230, and outer body portion 140, 240 can be separate pieces that are welded together by friction welding.

Although this disclosure has been shown and described with respect to detailed embodiments thereof, it will be understood by those skilled in the art that various changes in form and detail thereof may be made without departing from the spirit and scope of the claimed disclosure. Accordingly, the preceding detailed description is merely exemplary in nature and is not intended to limit the disclosure or the application and uses of the disclosure. In particular, the described embodiments are not limited to use in conjunction with a particular type of machine 10. For example, the described embodiments may be applied to machines employed in mining, construction, farming, and power generation applications, or any variant thereof. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

It will be understood that the benefits and advantages described above may relate to one embodiment or may relate to several embodiments. The embodiments are not limited to those that have any or all of the stated benefits and advantages.

What is claimed is:

1. An annular support structure for a track vehicle, the annular support structure comprising:
    a first hub portion circumferentially extending around a lateral axis;
    a first web extending radially outward from the first hub portion;
    a first outer body portion located radially outward from the first web;
    a first inner protrusion extending circumferentially from the first hub portion;
    a first outer protrusion extending circumferentially from the first web distal to the first hub portion;
    a first middle protrusion extending circumferentially from the first web between the first inner protrusion and the first outer protrusion;
    a second hub portion circumferentially extending around the lateral axis;
    a second web spaced apart from the first web, the second web extending radially outward from the second hub portion;
    a second outer body portion located radially outward from the second web, the second outer body portion adjacent to the first outer body portion;

a second inner protrusion extending circumferentially from the second hub portion and welded to the first inner protrusion at an inner joint;
a second outer protrusion extending circumferentially from the second web distal to the second hub portion, forming a lap joint with the first outer protrusion at an outer joint; and
a second middle protrusion extending circumferentially from the second web between the second inner protrusion and the second outer protrusion and welded to the first middle protrusion at a middle joint.

2. The annular support structure of claim 1, wherein the lap joint forms a labyrinth.

3. The annular support structure of claim 1, further comprising a first cavity formed by the first hub portion, the second hub portion, the first web, the second web, the first middle protrusion and the second middle protrusion.

4. The annular support structure of claim 3, further comprising a second cavity formed by the first outer body portion, the second outer body portion, a portion of the first web, a portion of the second web, the first middle protrusion and the second middle protrusion.

5. The annular support structure of claim 4, wherein the middle joint and the inner joint are friction welds.

6. The annular support structure of claim 1, wherein the outer joint and the inner joint extend circumferentially around a lateral center of the annular support structure.

7. The annular support structure of claim 5, wherein the first outer body portion, the first web, and first hub portion are formed from a single unitary piece of parent material.

8. The annular support structure of claim 1, wherein the first hub portion, the first web, and the first outer body portion are forged.

9. An annular support structure for a track vehicle, the annular support structure comprising:
a first piece circumferentially extending around a lateral axis, the first piece including
a first inner protrusion extending laterally,
a first outer protrusion extending laterally and spaced from and positioned outward of the first inner protrusion, and
a first middle protrusion extending laterally between the first inner protrusion and the first outer protrusion; and
a second piece adjacent to the first piece, the second piece centered about the lateral axis, the second piece including
a second inner protrusion welded to the first inner protrusion to form an inner joint,
a second outer protrusion extending laterally and interfacing with the first outer protrusion forming a lap joint concentric with the inner joint, and
a second middle protrusion extending laterally between the second inner protrusion and the second outer protrusion and welded to the first middle protrusion at a middle joint.

10. The annular support structure of claim 9, wherein the middle joint and the inner joint are friction welds.

11. The annular support structure of claim 9, wherein the lap joint forms a labyrinth.

12. The annular support structure of claim 9, further comprising a first cavity between the first inner protrusion, the second inner protrusion, the first middle protrusion and the second middle protrusion.

13. The annular support structure of claim 10, wherein the outer joint and the inner joint extend circumferentially around lateral center of the annular support structure.

14. The annular support structure of claim 9, wherein the first piece and the second piece are forged.

15. The annular support structure of claim 9, wherein the first inner protrusion, the second inner protrusion, the first outer protrusion, and the second outer protrusion taper narrower as they approach a lateral center of the annular support structure.

16. An annular support structure for a track vehicle, the annular support structure comprising:
a first hub portion including a central passage with a cylindrical shape, a longitudinal direction of the central passage defining a lateral axis and a radial direction orthogonal to the lateral axis;
a second hub portion circumferentially extending around the lateral axis;
a first outer body portion concentric to the hub;
a second outer body portion concentric to the second hub portion;
a first web extending between the first hub portion and the first outer body portion;
a second web laterally spaced from the first web and extending between the second hub portion and the second outer body portion;
a first inner protrusion extending circumferentially from the first hub portion;
a first outer protrusion extending circumferentially from the first web distal to the first hub portion;
a first middle protrusion extending circumferentially from the first web between the first inner protrusion and the first outer protrusion;
a second inner protrusion extending circumferentially from the second hub portion and welded to the first inner protrusion at an inner joint;
a second outer protrusion extending circumferentially from the second web distal to the second hub portion, forming a lap joint with the first outer protrusion at an outer joint;
a second middle protrusion extending circumferentially from the second web between the second inner protrusion and the second outer protrusion and welded to the first middle protrusion at a middle joint.

17. The annular support structure of claim 16, further comprising a first cavity formed by the first hub portion, the second hub portion, the first web, the second web, the first middle protrusion and the second middle protrusion.

18. The annular support structure of claim 17, further comprising a second cavity formed by the first outer body portion, the second outer body portion, a portion of the first web, a portion of the second web, the first middle protrusion and the second middle protrusion.

19. The annular support structure of claim 16, wherein the lap joint forms a labyrinth.

* * * * *